(12) United States Patent
Koyama (10) Patent No.: US 9,208,364 B2
(45) Date of Patent: Dec. 8, 2015

(54) IDENTIFICATION INFORMATION ACCESS DEVICE

(75) Inventor: Toshimi Koyama, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 368 days.

(21) Appl. No.: 13/611,212

(22) Filed: Sep. 12, 2012

(65) Prior Publication Data

US 2013/0087613 A1    Apr. 11, 2013

(30) Foreign Application Priority Data

Oct. 11, 2011   (JP) .................................. 2011-223930

(51) Int. Cl.
G06K 7/00     (2006.01)
G06K 7/10     (2006.01)

(52) U.S. Cl.
CPC .................................. G06K 7/10178 (2013.01)

(58) Field of Classification Search
USPC ................... 235/375, 439, 451, 492; 705/41; 340/10.1–10.4, 572.1–572.7; 463/16, 463/17, 25, 29, 42, 43, 47
See application file for complete search history.

(56) References Cited

U.S. PATENT DOCUMENTS

| | | | |
|---|---|---|---|
| 2003/0092491 A1 | 5/2003 | Fujimoto | |
| 2007/0026949 A1 | 2/2007 | Charlier et al. | |
| 2008/0231449 A1* | 9/2008 | Moshfeghi | G01D 21/00 340/572.1 |
| 2009/0093293 A1 | 4/2009 | Koyama | |
| 2009/0325665 A1* | 12/2009 | Koyama | G07F 17/3251 463/16 |
| 2011/0241837 A1* | 10/2011 | Suzuki | H01Q 1/2216 340/10.1 |

FOREIGN PATENT DOCUMENTS

| | | |
|---|---|---|
| JP | H10215210 | 8/1998 |
| JP | 2000-138621 | 5/2000 |
| JP | 2003144742 | 5/2003 |
| JP | 2004-241929 | 8/2004 |
| JP | 2004-253858 | 9/2004 |
| JP | 2005-102101 | 4/2005 |
| JP | 2006-231089 | 9/2006 |
| JP | 2009093340 | 4/2009 |

OTHER PUBLICATIONS

Japanese Office Action dated Dec. 9, 2014.
The Final Rejection, Japan Patent Office, Apr. 28, 2015, JP Patent Application No. JP 2011-223930.

* cited by examiner (Continued)

*Primary Examiner* — Michael G Lee
*Assistant Examiner* — Tabitha Chedekel
(74) *Attorney, Agent, or Firm* — Lex IP Meister, PLLC (57) ABSTRACT

The present invention provides an identification information access device configured to read identification information stored in an RFID tag even if the RFID tag is located at a position at which identification information of the RFID tag has been difficult to read. An identification information access device includes: a first antenna unit configured to read identification information stored in an RFID IC tag included in a storage medium; a control device configured to be electrically connected to the first antenna unit and to drive the first antenna unit so as to acquire the identification information in accordance with an electromagnetic wave transmitted from the first antenna unit; and a second antenna unit configured to be independent from the first antenna unit, to be disposed at a position separated from the first antenna unit, and not to be electrically connected to the first antenna unit and to the control device.

18 Claims, 9 Drawing Sheets

IDENTIFICATION INFORMATION ACCESS DEVICE

CROSS REFERENCE TO RELATED APPLICATIONS

This application claims priority of Japanese Patent Application No. 2011-223930 filed on Oct. 11, 2011. The contents of this application are incorporated herein by reference in their entirety.

BACKGROUND OF THE INVENTION

1. Field of the Invention

The present invention relates to an identification information access device that is configured to access a greater number of neighboring game chips which are identical in shape used in, for example, casinos.

2. Description of the Related Art

In casinos, a game chip into which an RFID tag is integrated is used to determine whether the game chip is authentic or to automatically measure the number of the game chips. In particular, an antenna for reading an RFID is provided below a game table and the antenna generates a magnetic field. The generated magnetic field penetrates the game chips placed on the game table to produce electromotive force in the RFID tag and detects identification information (unique ID) of bet chips (for example, refer to United States Patent Publication No. 2003/0092491 and Japanese Patent No. 4409540).

In a case in which plural antennas are provided for the reading and writing, processing to select one of these antennas is necessary (for example, refer to United States Patent Publication No. 2009/0093293).

In the devices described in United States Patent Publication No. 2003/0092491 and Japanese Patent No. 4409540, a range of the magnetic field is determined by the shape of the antenna and by the output of RF signals applied to the antenna. If the RFID tag is separated from the antenna by a predetermined distance in accordance with sensitivity of the RFID tag, electromotive force necessary to operate the IC is not produced in the RFID tag. Therefore, reading information, such as identification information of the RFID tag, has been difficult.

In some situation, for example, plural game chips are stacked on a game table. At positions near the game table, the distance to the antenna is short and thus intensity of the magnetic field is large. Therefore, it is possible to produce sufficient electromotive force and to read the RFID tag. However, at positions separated from the game table, the distance to the antenna is long and thus intensity of the magnetic field is small. Therefore, it is not possible to produce sufficient electromotive force and reading the RFID tag is difficult. There is a case that, when plural game chips are stacked on the game table, reading the RFID tags of all the stacked game chips is difficult. The distance to the position at which the RFID tag can be read is typically determined by, for example, intensity of the electromagnetic wave and sensitivity of the RFID tag: therefore, the distance is not uniformly determined.

In the device described in United States Patent Publication No. 2009/0093293, it is necessary to perform processing to select one of plural antennas. It takes time to complete reading from and writing in all of the plural antennas. In addition to that, the processing to select antennas makes control processing be complicated. Further, there is a possibility that interference occurs between the plural antennas, and check processing is necessary after the reading and writing. This takes time and makes the processing be complicated.

The present invention has been made in view of circumstance described above, and an object thereof is to provide an identification information access device that is configured to read identification information stored in an RFID tag even if the RFID tag is located at a position at which it has been considered to be difficult to read the RFID tag because of the long distance from an antenna.

SUMMARY OF THE INVENTION

An identification information access device according to aspect of the present invention, comprising:

a first antenna unit configured to read identification information stored in an RFID IC tag included in a storage medium;

a control device configured to be electrically connected to the first antenna unit and to drive the first antenna unit so as to acquire the identification information in accordance with an electromagnetic wave transmitted from the first antenna unit; and a second antenna unit configured to be independent from the first antenna unit, to be disposed at a position separated from the first antenna unit, and not to be electrically connected to the first antenna unit and to the control device.

The identification information access device according to the aspect of the present invention, wherein the second antenna unit includes a resonance unit configured to receive the electromagnetic wave transmitted from the first antenna unit and to resonate with the received electromagnetic wave.

The identification information access device according to the aspect of the present invention, wherein the resonance unit includes a resonant circuit provided with an antenna configured to receive the electromagnetic wave transmitted from the first antenna unit, an electrostatic member having predetermined electrostatic capacity, and a resistance member having predetermined resistance.

The identification information access device according to the aspect of the present invention, wherein:

the storage medium includes a control unit configured to read the identification information; and electromotive force necessary to drive the control unit is produced by an electromagnetic wave generated by driving the first antenna unit and driving the second antenna unit, and the electromotive force is supplied to the control unit.

The identification information access device according to the aspect of the present invention, wherein, at a position at which the storage medium can be disposed, intensity of the electromagnetic wave generated by driving the first antenna unit and driving the second antenna unit is made to be equal to or greater than predetermined intensity.

The identification information access device according to the aspect of the present invention, wherein the frequency of the electromagnetic wave generated by driving the first antenna unit by the control device and the electromagnetic wave generated by driving the second antenna unit by the resonance unit is the same as the frequency of the electromagnetic wave transmitted from the first antenna unit.

The identification information access device according to the aspect of the present invention, wherein the storage medium is a casino game chip into which an RFID IC tag is integrated.

It is possible to access an RFID tag located at a position at which it has been considered to be difficult to access.

DESCRIPTION OF THE PREFERRED EMBODIMENTS

Hereinafter, an embodiment will be described with reference to the drawings.

(Outline of Identification Information Access Device)

Figure 1:
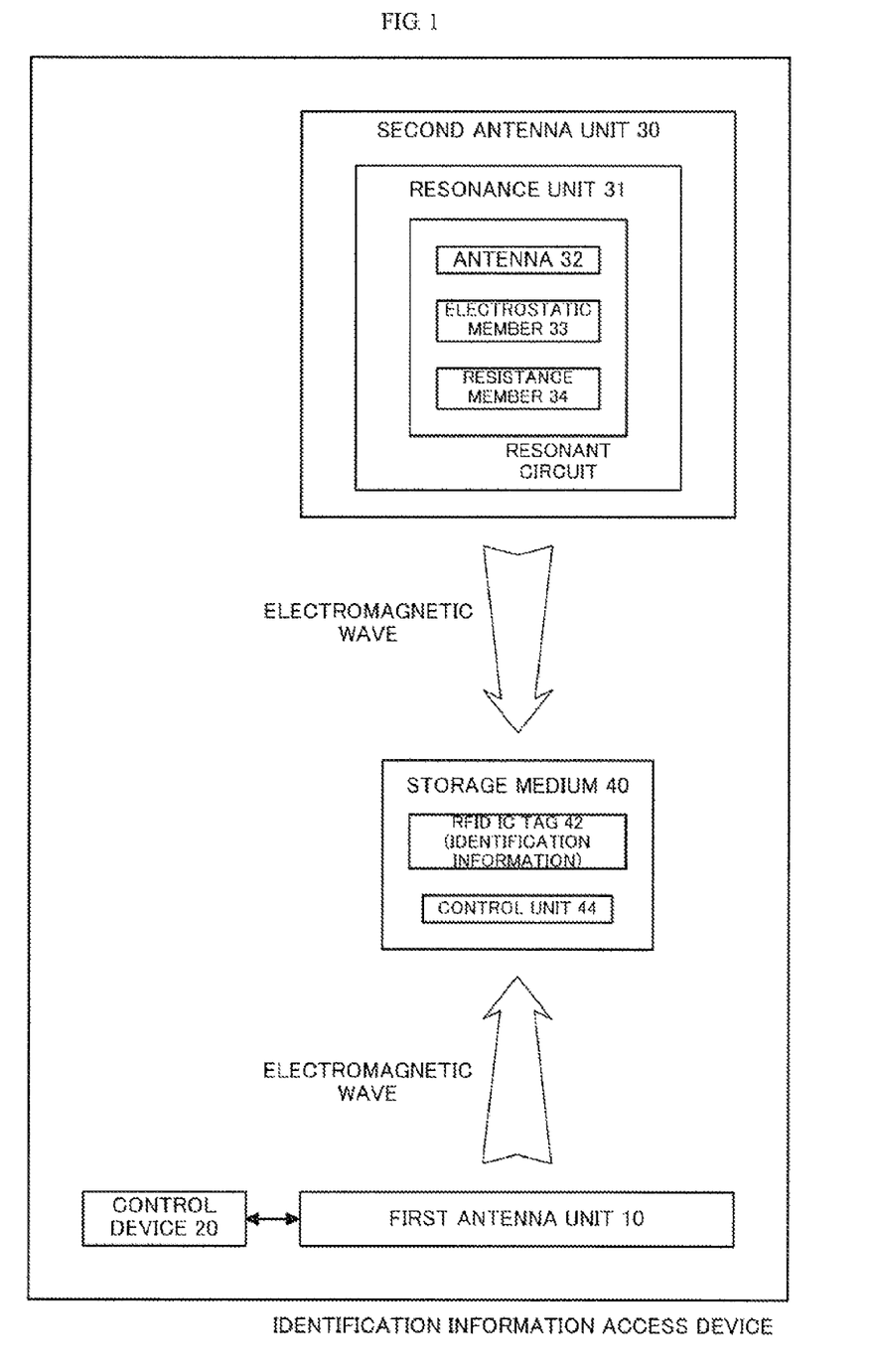
FIG. 1 is a block diagram illustrating an outline of an identification information access device.

FIG. 1 is a block diagram illustrating an outline of an identification information access device.

The identification information access device according to the embodiment of the present invention includes a first antenna unit 10 (for example, a first antenna device 100 which will be described later), a control device (for example, an RF reader/writer 200 which will be described later) and a second antenna unit (for example, a second antenna device 300 which will be described later). The first antenna unit 10 is configured to read identification information stored in an RFID IC tag 42 (for example, an RFID IC tag 410 which will be described later) included in a storage medium 40 (for example, a game chip 400 which will be described later). The control device is configured to be electrically connected to the first antenna unit 10 and to drive the first antenna unit 10 so as to acquire the identification information in accordance with an electromagnetic wave transmitted from the first antenna unit 10. The second antenna unit 30 is configured to be independent from the first antenna unit 10, to be disposed at a position separated from the first antenna unit 10, and not to be electrically connected to the first antenna unit 10 and to the control device 20.

In this configuration, the second antenna device 30 can receive the electromagnetic wave transmitted from the first antenna unit 10 and also can transmit the electromagnetic wave in accordance with the received electromagnetic wave. In this manner, the electromagnetic wave may be transmitted also from the second antenna unit 30 located at a position separated from the first antenna unit 10. It is therefore possible to reliably send the electromagnetic wave transmitted from the first antenna unit 10 or the electromagnetic wave transmitted from the second antenna unit 30 to a position at which it has been considered to be difficult to read the RFID tag. Thus, the storage medium 40 can receive the electromagnetic wave.

Since it is possible to make the second antenna unit 30 transmit the electromagnetic wave only by the electromagnetic wave transmitted from the first antenna unit 10, it is not necessary to supply power to the second antenna unit 30. Therefore, the configuration and processing can be made simple.

The second antenna unit 30 can transmit the electromagnetic wave without the need of any electrical connection to the control device by, for example, a lead wire. Therefore, it is possible to make the configuration be simple and make control processing of the second antenna unit 30 be unnecessary.

Further, even in a configuration in which the first antenna unit 10 and the second antenna unit 30 are provided, processing and a device to select the antennas are unnecessary. Therefore, the configuration and processing can be made simple.

Even in a configuration in which the first antenna unit 10 and the second antenna unit 30 are provided, since the identification information can be read only by the first antenna unit 10, processing to check the identification information after reading is unnecessary. Therefore, the processing can be made simple and processing time can be shortened. In addition to that, the identification information is read only by the first antenna unit 10, the identification information can be read with no influence of interference.

A feature of the embodiment of the present invention is, in the configuration described above, that the second antenna unit 30 includes a resonance unit 31 (for example, a resonance device 310 which will be described later) configured to receive the electromagnetic wave transmitted from the first antenna unit 10 and to resonate with the received electromagnetic wave. The resonance unit 31 is made to resonate in accordance with the received electromagnetic wave.

According to this configuration, since the resonance unit 31 is configured to resonate by the received electromagnetic wave, the received electromagnetic wave and the electromagnetic wave caused by the resonance can be generated. Therefore, it is possible to reliably transmit the electromagnetic wave from the second antenna unit 30. Since it is only necessary to cause resonation, power supply to the second antenna unit 30 is not necessary, and therefore the configuration and processing can be made simple.

A feature of the embodiment of the present invention is, in the configuration described above, that the resonance unit 31 includes a resonant circuit provided with an antenna 32 (for example, an antenna 320 which will be described later) configured to receive the electromagnetic wave transmitted from the first antenna unit 10, an electrostatic member 33 (for example, a condenser 330 which will be described later) having predetermined electrostatic capacity, and a resistance member 34 (for example, a resistor 340 which will be described later) having predetermined resistance.

According to this configuration, desired resonance conditions can be defined easily in accordance with various conditions about, for example, the electromagnetic wave transmitted from the first antenna unit 10. Therefore, the configuration can be made simple and the device is made easy to use.

A feature of the embodiment of the present invention is, in the configuration described above, that the storage medium 40 includes a control unit 44 (for example, a control unit 412 which will be described later) configured to read the identification information and electromotive force necessary to drive the control unit 44 is produced by an electromagnetic wave generated by driving the first antenna unit 10 and driving the second antenna unit 30, and the electromotive force is supplied to the control unit 44.

According to this configuration, the electromotive force necessary to drive the control unit 44 is produced by the electromagnetic wave generated by driving the first antenna unit 10 and driving the second antenna unit 30. Therefore, the control unit 44 can be driven without any power, such as a battery, and the configuration of the storage medium 40 can be made simple. Since the control unit 44 can be driven, the identification information can be supplied to the control device even in a case in which the RFID tag is located at a position at which it has been considered to be difficult to read the RFID tag.

A feature of the embodiment of the present invention is, in the configuration described above, that, at a position at which the storage medium 40 can be disposed, intensity of the electromagnetic wave generated by driving the first antenna unit 10 and driving the second antenna unit 30 is made to be equal to or greater than predetermined intensity.

According to this configuration, since the intensity is equal to or greater than the predetermined intensity, electromotive force necessary to drive the control unit 44 can be produced even in a case in which the RFID tag is located at a position at which it has been considered to be difficult to read the RFID tag.

A feature of the embodiment of the present invention is, in the configuration described above, that the frequency of the electromagnetic wave generated by driving the first antenna unit 10 by the control device 20 and the electromagnetic wave generated by driving the second antenna unit 30 by the resonance unit is the same as the frequency of the electromagnetic wave transmitted from the first antenna unit 10.

According to this configuration, since electromagnetic waves of the same frequency are generated, resonance can be caused reliably and the electromotive force necessary to drive the control unit 44 can be produced reliably.

A feature of the embodiment of the present invention is, in the configuration described above, that the storage medium 40 is a casino game chip into which an RFID IC tag is integrated.

This configuration allows casino game chips used in casinos to be managed reliably.

(Configuration of Identification Information Access Device 1)

Figure 2:
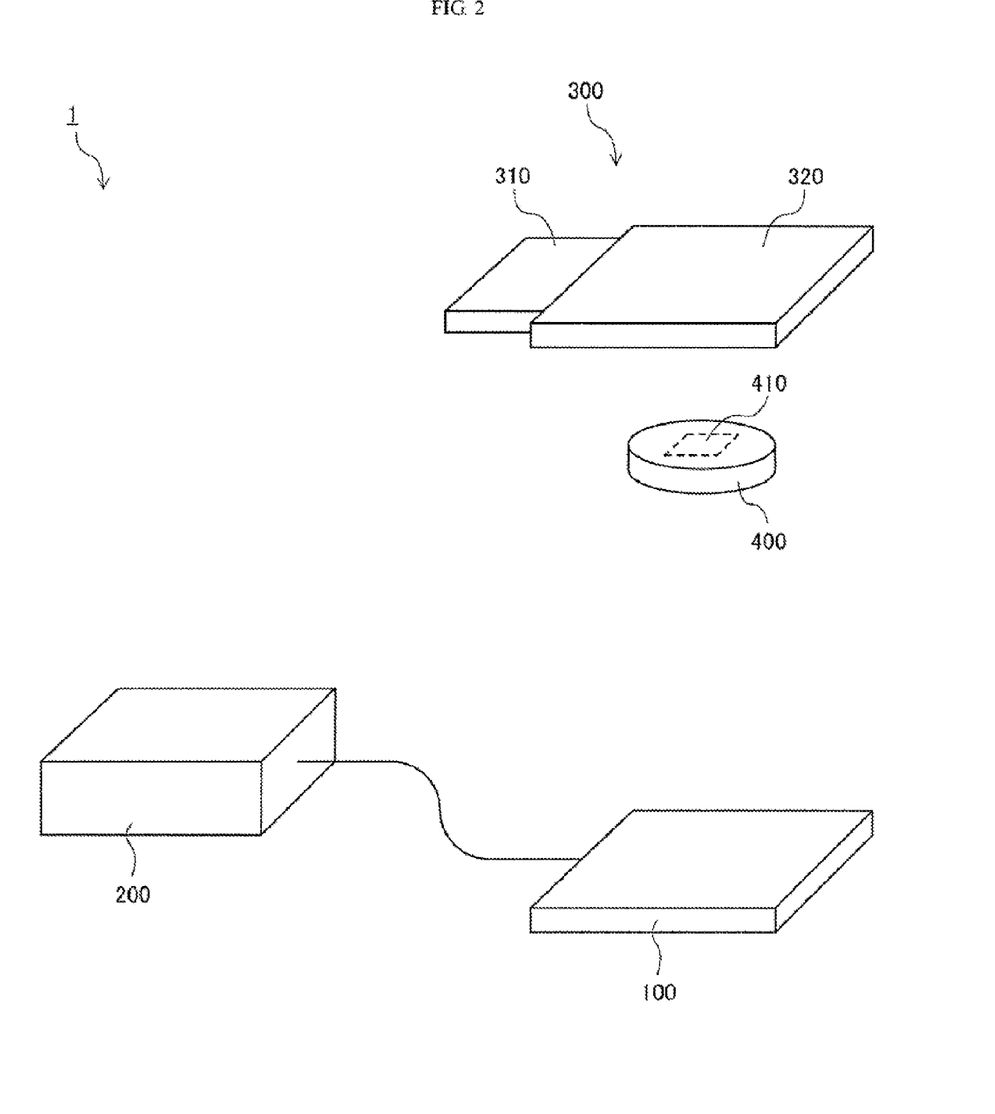
FIG. 2 is a schematic diagram illustrating a configuration of an identification information access device 1 according to the present embodiment.

FIG. 2 is a schematic diagram illustrating a configuration of an identification information access device 1. The identification information access device 1 includes a first antenna device 100, an RF reader/writer 200 and a second antenna device 300.

(Second Antenna Device 300)

The second antenna device 300 includes a resonance device 310.

(Configuration of Resonance Device 310)

Figure 3:
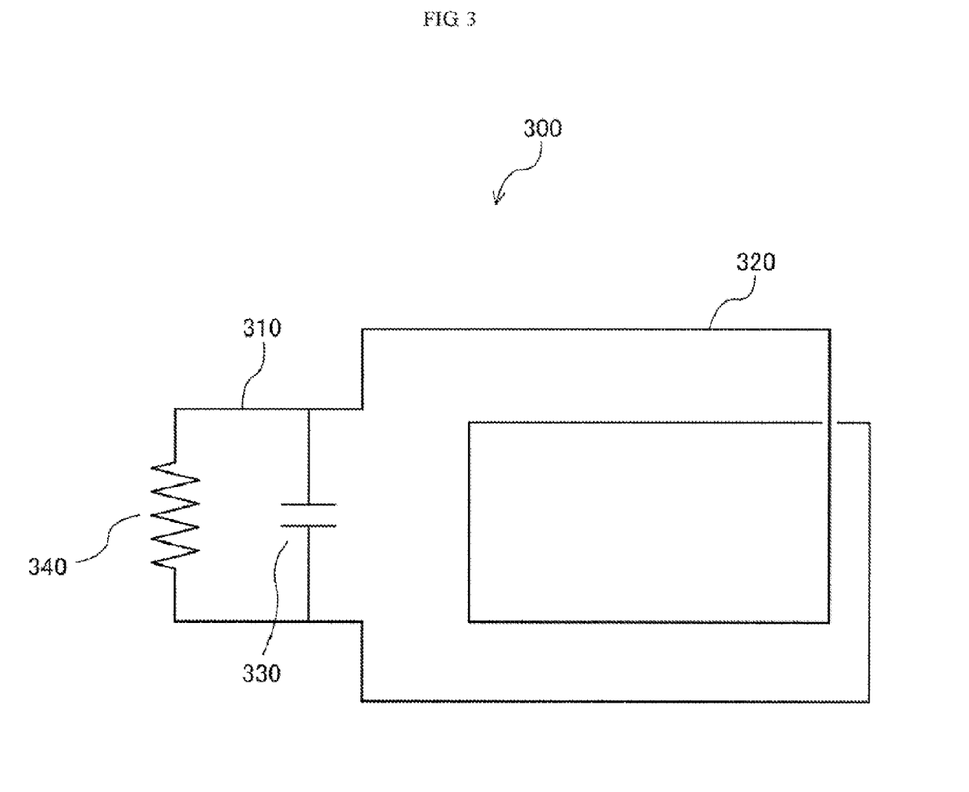
FIG. 3 is a diagram illustrating a specific configuration of a resonance device 310.

FIG. 3 is a diagram illustrating a specific configuration of the resonance device 310. The resonance device 310 is configured by a resonant circuit including an antenna 320, a condenser 330 and a resistor 340 which are connected in parallel. That is, the resonance device 310 is configured by a circuit which is called an RLC parallel circuit.

In the resonance device 310, the antenna 320 is what is called an antenna considered to be used in the HF band. The antenna 320 is a loop antenna configured by a circular (loop-shaped) lead wire. The antenna 320 functions as a coil of inductance L. A magnetic field component is dominant in the vicinity of the antenna 320.

The condenser 330 has capacitance C. The resistor 340 has resistance R. The resonance frequency in the resonance device 310 may be defined by determining the inductance L and the capacitance C suitably. The resonance frequency is substantially the same as the frequency of the electromagnetic wave generated by the first antenna device 100 which will be described later.

The second antenna device 300 receives the electromagnetic wave generated by the first antenna device 100. In accordance with the received electromagnetic wave, the resonance device 310 generates a resonance wave of resonance frequency substantially the same as the frequency of the received electromagnetic wave, and outputs the resonance wave from the antenna 320.

The second antenna device 300 is not electrically connected to the configuration of the first antenna device 100 and the RF reader/writer 200 which will be described later. The second antenna device 300 is disposed at a position separated from the first antenna device 100 and the RF reader/writer 200.

(First Antenna Device 100)

The first antenna device 100 is configured by an antenna 110. The antenna 110 is, like the antenna 320, an antenna considered to be used in the HF band. The antenna 110 is what is called a loop antenna configured by a circular (loop-shaped) lead wire. Like the antenna 320, the antenna 110 functions as a coil of predetermined inductance. The magnetic field component is dominant in the vicinity of the antenna 110. The first antenna device 100 is electrically connected to the RF reader/writer 200 which will be described later.

The first antenna device 100 transmits, to the game chips 400, modulating signals received from a modulation unit 222 of the RF reader/writer 200, which will be described later, as a modulating wave. The first antenna device 100 receives the modulating wave transmitted from the game chips 400 and supplies the received modulating wave to a demodulation unit 224 of the RF reader/writer 200, which will be described later, as the modulating signals.

(Configuration of RF Reader/Writer 200)

Figure 4:
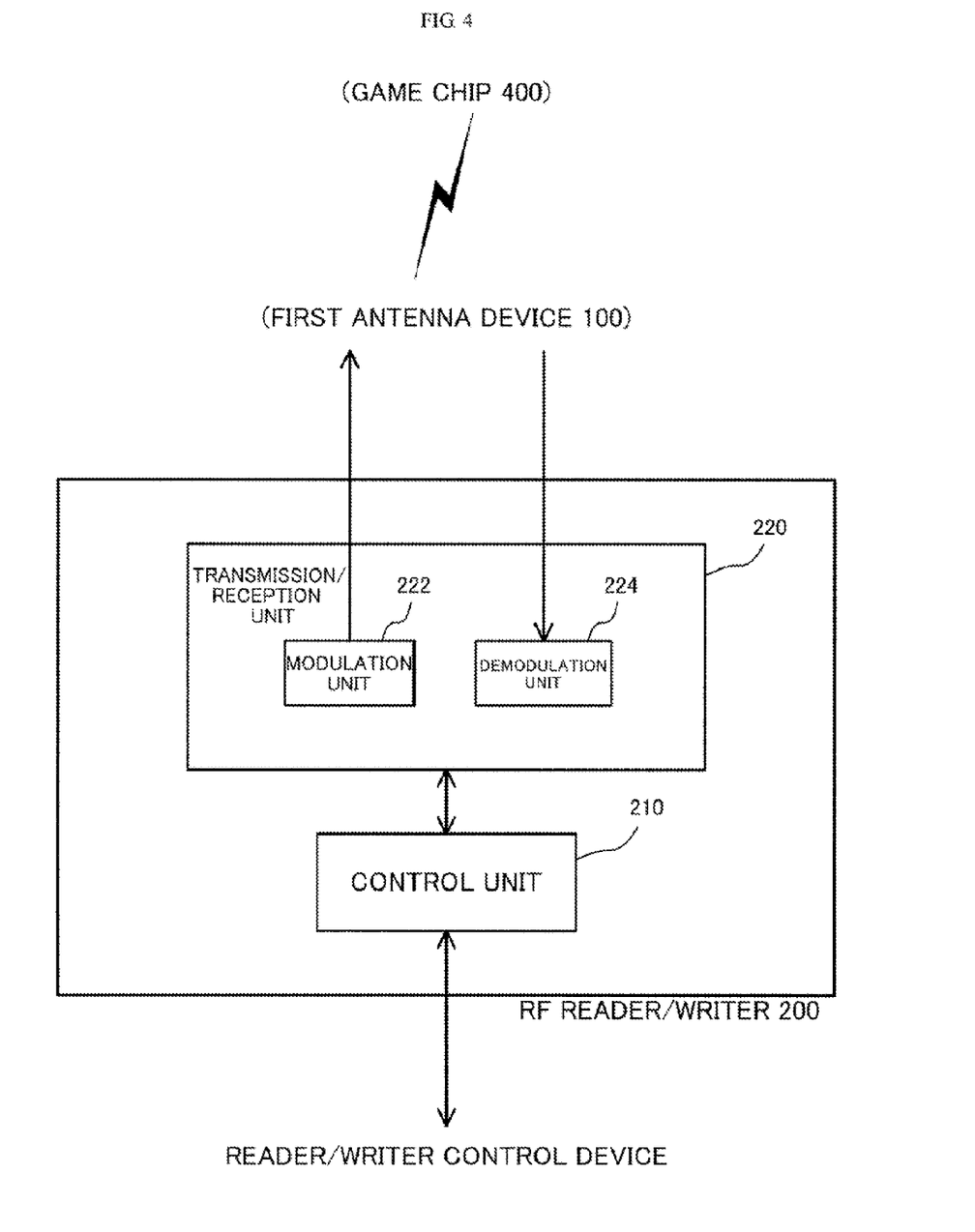
FIG. 4 is a block diagram illustrating a configuration of an RF reader/writer 200.

FIG. 4 is a block diagram illustrating a configuration of the RF reader/writer 200.

The RF reader/writer 200 is electrically connected to the first antenna device 100. The RF reader/writer 200 can access, via the first antenna device 100, the RFID IC tag 410 (refer to FIG. 2) provided inside the game chip 400 which will be described later. In particular, the RF reader/writer 200 reads or writes various kinds of information stored in the RFID IC tag 410 of the game chip 400 via wireless communication using the first antenna device 100.

Various kinds of information stored in the RFID IC tag 410 include chip identification information. The chip identification information is, for example, a chip ID (for example, an ID serial number) for the identification of the game chip 400. Use of a rewritable RFID IC tag 410 allows the RF reader/writer 200 to write desired information in the RFID IC tag 410. The RFID IC tag 410 can store various kinds of information: among them, the chip identification information will be mainly described hereinafter.

The RF reader/writer 200 includes a control unit 210 and a transmission/reception unit 220. The transmission/reception unit 220 is electrically connected to the control unit 210. The control unit 210 receives instruction issued by a reader/writer control device (refer to FIG. 4). The control unit 210 drives the transmission/reception unit 220 in accordance with the received instruction.

The transmission/reception unit 220 is driven by the control unit 210 to read the chip identification information transmitted from the game chip 400. The control unit 210 transmits the read chip identification information to the reader/writer control device. The control unit 210 is configured by a microcomputer which includes a CPU, ROM and RAM (not illustrated).

The transmission/reception unit 220 has a function to make wireless communication with the RFID IC tag 410 of the game chip 400 via the first antenna device 100. The transmission/reception unit 220 includes the modulation unit 222 and the demodulation unit 224. The transmission/reception unit 220 is configured by, for example, an RF module which includes a modulation circuit and a demodulation circuit.

The modulation unit 222 modulates a carrier wave by a predetermined modulating system in accordance with information, including a predetermined command, a request and instruction received from the control unit 210, and generates a modulating wave (the modulating signals). The generated modulating wave is supplied to the first antenna device 100 and is transmitted as an electromagnetic wave from the first antenna device 100.

The modulating wave received by the first antenna device 100 is supplied to the demodulation unit 224 as the modulating signals. This modulating wave is an electromagnetic wave modulated from a carrier wave in a predetermined modulating system in accordance with data stored in the RFID IC tag 410 in the game chip 400. The demodulation unit 224 demodulates the modulating signals supplied from the first antenna device 100, takes the data stored in the RFID IC tag 410 out and sends the taken data to the control unit 210. In this manner, the chip identification information stored in the RFID IC tag 410 is sent to the control unit 210.

As described above, the RF reader/writer 200 is configured to access to the RFID IC tag 410 of the game chip 400, which will be described later, by transmitting and receiving the electromagnetic wave with the first antenna device 100.

(Configuration of Game Chip 400)

Figure 5:
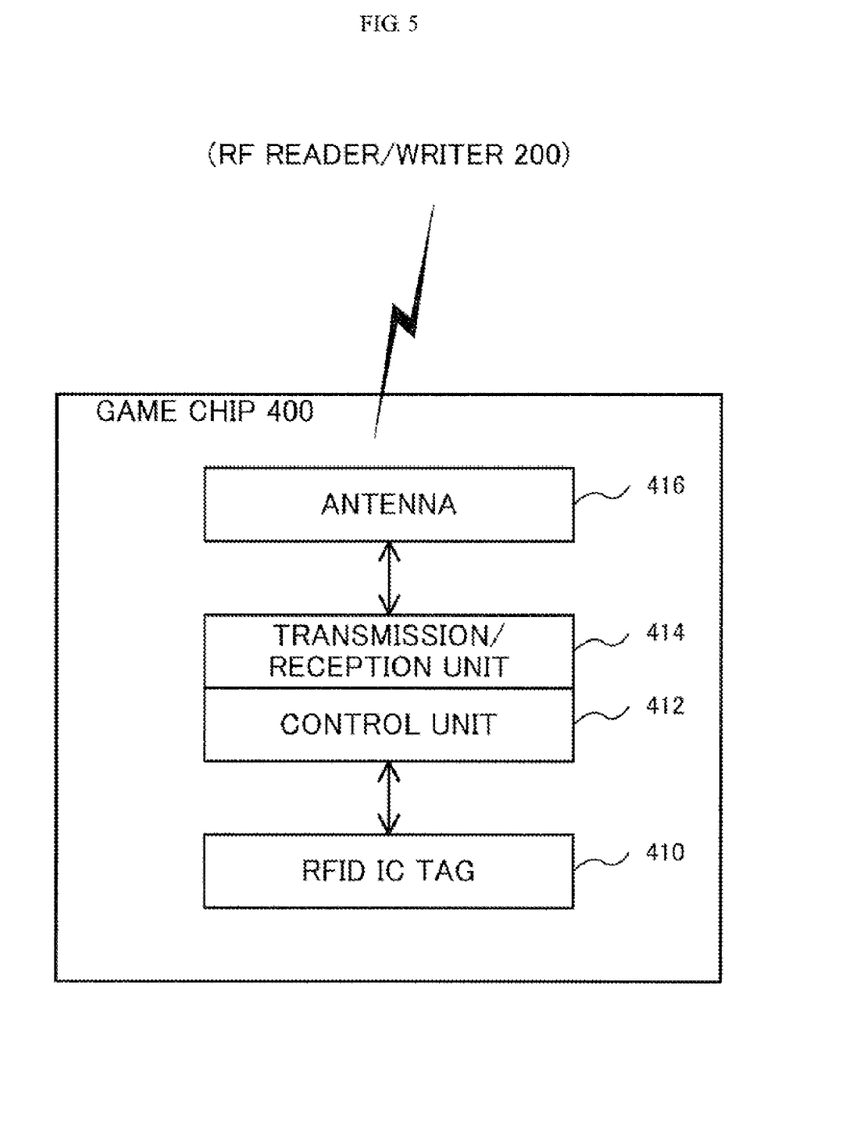
FIG. 5 is a block diagram illustrating a configuration of a game chip 400.

FIG. 5 is a block diagram illustrating a configuration of a game chip 400.

The game chip 400 is a game medium (a storage medium) exchanged among, for example, a dealer and a player instead of cash in a gaming place, such as a casino. Typically, the game chip 400 is a resin-made medium which is formed as, for example, a circular plate.

The game chip 400 includes the RFID IC tag 410, a control unit 412, a transmission/reception unit 414 and an antenna 416.

The RFID IC tag 410 stores the chip identification information which is readable by a signal generated by the RF reader/writer 200. Use of a rewritable IC tag 410 allows the RF reader/writer 200 to write desired information in the IC tag 410.

The control unit 412 interprets, for example, a command, a request and an instruction issued by the RF reader/writer 200 and performs an operation in accordance with these command, request and instruction. The transmission/reception unit 414 includes a modulation unit (not illustrated) and a demodulation unit (not illustrated). The transmission/reception unit 414 modulates and demodulates signals for wireless transmission and reception of various kinds of information, including the chip identification information to and from the RF reader/writer 200.

The antenna 416 is configured to receive the modulating wave from the first antenna device 100 which is connected to the RF reader/writer 200. The antenna 416 is configured also to receive the resonance wave from the second antenna device 300.

If the intensity of the electromagnetic wave constituted by the modulating wave from the first antenna device 100 and the resonance wave from the second antenna device 300 is the predetermined intensity, electromotive force necessary to drive the control unit 412 and the transmission/reception unit 414 can be produced, and electric power is supplied to the control unit 412 and the transmission/reception unit 414 by the modulating wave and the resonance wave which are received.

When electric power is supplied to the control unit 412 and the transmission/reception unit 414 to drive the same by the modulating wave and the resonance wave, the transmission/reception unit 414 generates the modulating signals representing information, such as chip identification information, in accordance with the command, the request and the instruction issued by the RF reader/writer 200. The antenna 416 receives the modulating signals generated by the transmission/reception unit 414 and transmits the modulating wave which represents the chip identification information. The frequency of this modulating wave differs from the frequency of the electromagnetic wave transmitted from the first antenna device 100. As described above, the frequency of the electromagnetic wave transmitted from the first antenna device 100 is the same as the frequency of a resonance electromagnetic wave generated by the second antenna device 300.

The carrier wave generated by the antenna 416 is received by the first antenna device 100 described above and is supplied to the RF reader/writer 200. This configuration allows the RF reader/writer 200 to read the chip identification information stored in the RFID IC tag 410.

The antenna 416 is also an antenna considered to be used in the HF band. The antenna 416 is what is called a loop antenna configured by a circular (loop-shaped) lead wire. A magnetic field component is dominant in the vicinity of the antenna 416. The antenna 416 for the game chip 400 is smaller than the antenna 110 of the first antenna device 100 and is smaller than the antenna 320 of the second antenna device 300. This allows the influence of the electromagnetic wave generated by the antenna 416 to be small.

(Electromagnetic Wave Generated by First Antenna Device 100 and Electromagnetic Wave Generated by Second Antenna Device 300)

The electromagnetic wave generated by driving the first antenna device 100 and driving the second antenna device 300 will be described with reference to FIGS. 6A, 6B, 7A and 7B.

Figure 6A:
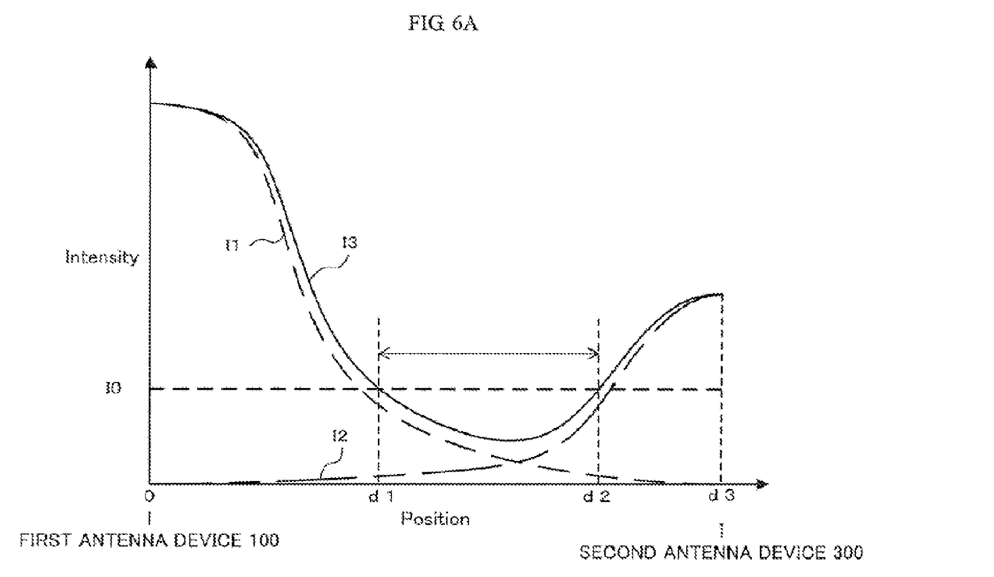
FIGS. 6A and 6B are graphs illustrating a relationship of the distance between a first antenna device 100 and a second antenna device 300 with intensity of the electromagnetic wave generated by driving the first antenna device 100 and driving the second antenna device 300.
Figure 6B:
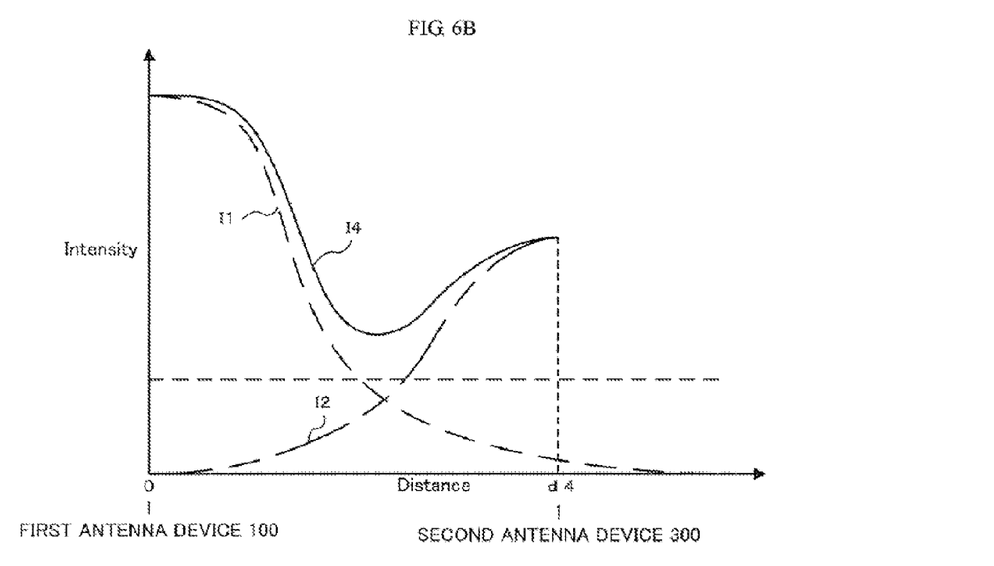

FIGS. 6A and 6B are graphs illustrating a relationship of the distance between the first antenna device 100 and the second antenna device 300 with the intensity of the electromagnetic wave generated by the first antenna device 100 and by the second antenna device 300. In FIGS. 6A and 6B, the horizontal axis of the graph represents positions of, for example, the first antenna device 100 and the second antenna device 300 on, for example, the meter basis. The vertical axis represents the intensity of the electromagnetic wave on, for example, the ampere per meter basis. The position of the starting point O of the horizontal axis of the graphs in FIGS. 6A and 6B is a position at which the first antenna device 100 is disposed.

Figure 7A:
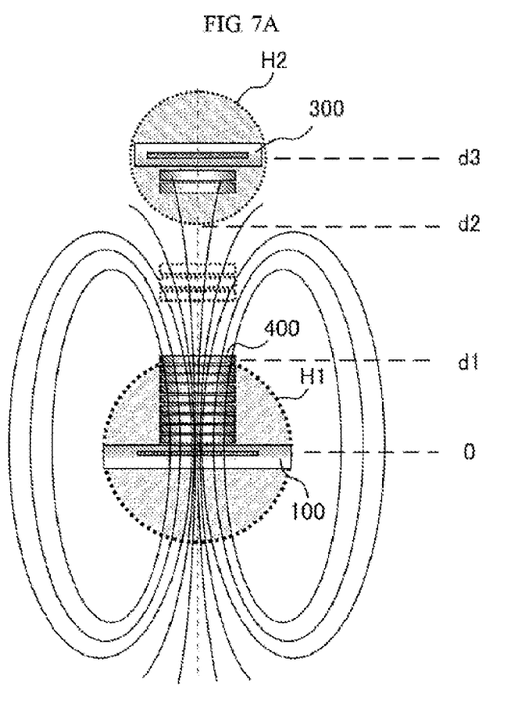
FIGS. 7A and 7B are diagrams illustrating electromagnetic waves and lines of magnetic force generated by driving the first antenna device 100 and driving the second antenna device 300.
Figure 7B:
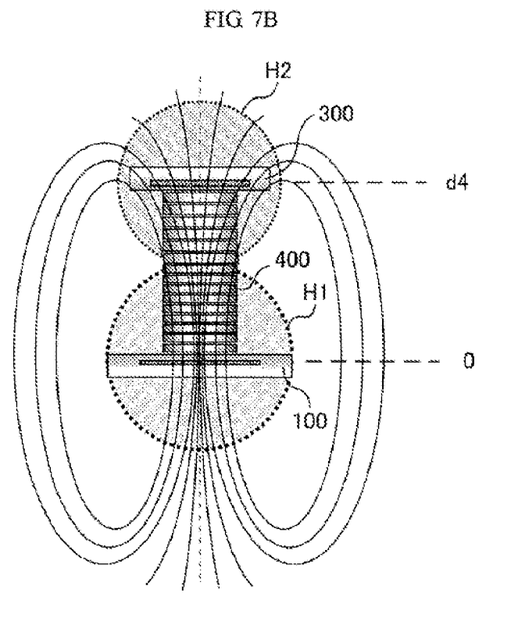

FIGS. 7A and 7B are diagrams illustrating the electromagnetic wave and the lines of magnetic force generated by the first antenna device 100, and the electromagnetic wave generated by the second antenna device 300.

FIG. 6A is a graph and FIG. 7A is a diagram in a case in which the first antenna device 100 is disposed at the starting point O and the second antenna device 300 is disposed at a position d3. FIG. 6B is a graph and FIG. 7B is a diagram in a case in which the first antenna device 100 is disposed at the starting point O and the second antenna device 300 is disposed at a position d4. The position d4 is closer to the starting point O than the position d3.

In FIGS. 6A and 6B, a dashed line I1 is a curve representing the intensity of the electromagnetic wave generated by the first antenna device 100. The resonance device 310 of the second antenna device 300 is made to resonate in accordance with the electromagnetic wave generated by the first antenna device 100, and the electromagnetic wave (hereafter, referred to as resonance electromagnetic wave) is generated by the resonance device 310 of the second antenna device 300. A dash-dot line I2 is a curve representing the intensity of the electromagnetic wave generated by the second antenna device 300. A solid line I3 in FIG. 6A and a solid line I4 in FIG. 6B are curves representing the electromagnetic field intensity of a position at which the electromagnetic wave generated by the first antenna device 100 and the electromagnetic wave generated and transmitted from the resonance device 310 of the second antenna device 300 are synthesized. Hereinafter, this electromagnetic field intensity is referred to as synthetic electromagnetic field intensity.

In FIGS. 6A and 6B, intensity I0 extending horizontally represents the intensity of the minimum electromagnetic wave to produce electromotive force necessary to drive the control unit 412 of the game chip 400. Therefore, if an electromagnetic wave of intensity equal to or greater than the intensity I0 is received by the antenna 416 of the game chip 400, the electromotive force necessary to drive the control unit 412 and the transmission/reception unit 414 can be produced. Thus, reading from and writing in the RFID IC tag are achieved. If an electromagnetic wave of intensity smaller than the intensity I0 is received by the antenna 416 of the game chip 400, the electromotive force necessary to drive the control unit 412 and the transmission/reception unit 414 cannot be produced. Thus, reading from and writing in the RFID IC tag are not achieved.

In the case of FIG. 6A, the second antenna device 300 is disposed at the position d3. In this case, as illustrated in the solid line I3, the synthetic electromagnetic field intensity I3 is smaller than the intensity I0 between the positions d1 and d2. Therefore, if the game chip 400 is disposed at a position between the positions d1 and d2, the electromagnetic wave of which synthetic electromagnetic field intensity I3 is smaller than the intensity I0 is received by the antenna 416 of the game chip 400. Thus, electromotive force necessary to drive the control unit 412 cannot be produced and reading from and writing in the RFID IC tag are not achieved.

In the case of FIG. 6B, the second antenna device 300 is disposed at the position d4 which is closer to the starting point O than the position d3. In this case, the synthetic electromagnetic field intensity I4 is larger than the intensity I0 at an arbitrary position between the first antenna device 100 and the second antenna device 300. Therefore, the electromagnetic wave of which synthetic electromagnetic field intensity I4 is equal to or greater than the intensity I0 at an arbitrary position between the first antenna device 100 and the second antenna device 300 is received by the antenna 416 of the game chip 400. When the electromagnetic wave of which intensity is equal to or greater than the intensity I0 is received, electric power can be supplied to the control unit 412 and to the transmission/reception unit 414 of the game chip 400. The supplied electric power drives the control unit 412 and the transmission/reception unit 414 and the carrier wave representing the chip identification information is transmitted from the game chip 400. Therefore, in the case of FIG. 6B, it is possible to dispose the game chip 400 at a position between the first antenna device 100 and the second antenna device 300.

As described above, FIGS. 6A and 6B are graphs illustrating the intensity of the electromagnetic wave. FIGS. 7A and 7B are diagrams illustrating the generated electromagnetic wave and the lines of magnetic force. FIG. 7A is a diagram, which is similar to FIG. 6A, illustrating an electromagnetic wave and lines of magnetic force generated in a case in which the first antenna device 100 is disposed at the starting point O and the second antenna device 300 is disposed at the position d3. FIG. 7B is a diagram, which is similar to FIG. 6B, illustrating an electromagnetic wave and lines of magnetic force generated in a case in which the first antenna device 100 is disposed at the starting point O and the second antenna device 300 is disposed at the position d4.

In a case in which the first antenna device 100 is disposed at the starting point O and the second antenna device 300 is disposed at the position d3, a part of the electromagnetic wave (lines of magnetic force) generated by the first antenna device 100 reaches the second antenna device 300 as illustrated in FIG. 7A. The electromagnetic wave having reached the second antenna device 300 causes the resonance device 310 of the second antenna device 300 to resonate and generate the resonance electromagnetic wave.

In FIG. 7A, an area in which intensity of the electromagnetic wave generated by the first antenna device 100 is greater than the intensity I0 is illustrated as H1. In the example illustrated in FIG. 7A, the first antenna device 100 is a circular coil and the area H1 is substantially spherical in shape. An area in which intensity of the resonance electromagnetic wave generated by the resonance by the resonance device 310 of the second antenna device 300 is greater than the intensity I0 is illustrated as H2. In the area H2, the second antenna device 300 is a circular coil and the area H2 is substantially spherical in shape.

In the example illustrated in FIG. 7A, nine game chips 400 (the game chips illustrated by solid lines in FIG. 7A) are included in the area H1. Since each of the nine game chips 400 are included in the area H1, it is possible to receive the electromagnetic wave of intensity equal to or greater than the intensity I0 and to produce electromotive force necessary to drive the control unit 412 and the transmission/reception unit 414. Thus, reading from and writing in the RFID IC tag are achieved.

Similarly, in the example illustrated in FIG. 7A, two game chips 400 (game chips illustrated by the solid line in FIG. 7A) are included in the area H2. Since each of the two game chips 400 is included in the area H2, it is possible to receive the electromagnetic wave of intensity equal to or greater than the intensity I0 and to produce electromotive force necessary to drive the control unit 412 and the transmission/reception unit 414. Thus, reading from and writing in the RFID IC tag are achieved.

However, in the example illustrated in FIG. 7A, an area with the synthetic electromagnetic field intensity being smaller than the intensity I0 exists between the area H1 and the area H2. This area corresponds to an area between the position d1 and the position d2 illustrated in FIG. 6A. Therefore, even if the game chips 400 (three game chips illustrated by the dashed line in FIG. 7A) are disposed between the position d1 and the position d2, the received electromagnetic wave is not able to produce electromotive force necessary to drive the control unit 412 and the transmission/reception unit 414 and thus reading from and writing in the RFID IC tag are not achieved.

In FIG. 7B, like FIG. 7A, an area in which intensity of the electromagnetic wave generated by the first antenna device 100 is greater than the intensity I0 is illustrated as H1. In the example illustrated in FIG. 7B, the first antenna device 100 is a circular coil and the area H1 is substantially spherical in shape. Similarly, an area in which intensity of the resonance electromagnetic wave generated by the resonance by the resonance device 310 of the second antenna device 300 is greater than the intensity I0 is illustrated as H2. Similarly, in the area H2, the second antenna device 300 is a circular coil and the area H2 is substantially spherical in shape.

In the case of the example illustrated in FIG. 7B, unlike FIG. 7A, an area in which the intensity of the electromagnetic wave is smaller than the intensity I0 does not exist between the area H1 and the area H2, and the synthetic electromagnetic field intensity is greater than the intensity I0 at an arbitrary position between the first antenna device 100 and the second antenna device 300. Therefore, the electromagnetic wave of which synthetic electromagnetic field intensity I4 is equal to or greater than the intensity I0 at an arbitrary position between the first antenna device 100 and the second antenna device 300 is received by the antenna 416 of the game chip 400. The electromagnetic wave of which synthetic electromagnetic field intensity is equal to or greater than the intensity I0 can supply electric power to the control unit 412 and the transmission/reception unit 414 of the game chip 400. The supplied electric power drives the control unit 412 and the transmission/reception unit 414 and the carrier wave representing the chip identification information is transmitted from the game chip 400.

In the example illustrated in FIG. 7B, fifteen game chips 400 (the game chips illustrated by the solid lines in FIG. 7B) are included between the first antenna device 100 and the second antenna device 300. Since these game chips 400 are always included in the area H1 or the area H2, the electromagnetic wave of the intensity equal to or greater than the intensity I0 is received in each of the fifteen game chips 400 and electromotive force necessary to drive the control unit 412 and the transmission/reception unit 414 can be produced. Therefore, reading from and writing in all the RFID IC tags of the fifteen game chips 400 are achieved.

In this manner, the adjustment the distance between the first antenna device 100 and the second antenna device 300 can produce sufficient electromotive force in the game chip 400: thus, reading from and writing in the RFID IC tag are achieved when the game chip 400 is disposed at an arbitrary position between the first antenna device 100 and the second antenna device 300.

As described above, the electromagnetic wave generated by the first antenna device 100 and the electromagnetic wave generated by the resonance device 310 of the second antenna device 300 are synthesized. In a case in which the electromagnetic wave of which synthetic electromagnetic field intensity at the synthesized position is equal to or greater than the intensity I0 is successfully received at the antenna 416 of the game chip 400, the electromotive force necessary for the driving can be supplied to the control unit 412 and the transmission/reception unit 414 of the game chip 400. The supplied electromotive force drives the control unit 412 and the transmission/reception unit 414 and the carrier wave representing the chip identification information is transmitted from the game chip 400.

Intensity I2 of the resonance electromagnetic wave generated by resonance of the resonance device 310 of the second antenna device 300 can be defined by adjusting the intensity I1 of the electromagnetic wave generated by the first antenna device 100. The intensity I1 of the electromagnetic wave transmitted from the first antenna device 100 can be defined by the control unit 210 of the RF reader/writer 200. The intensity I1 can be controlled by the reader/writer control device (refer to FIG. 4) connected to the RF reader/writer 200. Therefore, the control unit 210 of the RF reader/writer 200 and the reader/writer control device can configure an intensity setting device for adjusting or changing the intensity of the electromagnetic wave transmitted from the first antenna device 100.

Therefore, ranges of the area H1 and the area H2 can be defined by the distance between the first antenna device 100 and the second antenna device 300, the intensity of the electromagnetic wave transmitted from the first antenna device 100, and the sensitivity of the RFID tag.

Resonance conditions in the resonance device 310 of the second antenna device 300 can be defined by suitably adjusting the distance between the first antenna device 100 and the second antenna device 300, the time constant of the resonant circuit of the resonance device 310, and the frequency and intensity of the electromagnetic wave generated by the first antenna device 100.

In the above description, an example in which a single first antenna device 100 and a single second antenna device 300 are used has been described. In an alternative configuration, a single first antenna device 100 and plural second antenna devices 300 may be used.

It is possible to provide the first antenna device 100 and plural (i) second antenna devices 300(first to i-th) and to cause resonation sequentially. The first second antenna device 300(1) which is closest to the first antenna device 100 is made to resonate by the electromagnetic wave transmitted from the first antenna device 100 and is made to generate a resonance electromagnetic wave. Next, the second second antenna device 300(2) that is closest to the first second antenna device 300(1) is made to resonate by the resonance electromagnetic wave transmitted from the first antenna device 100 and is made to generate a further resonance electromagnetic wave. Next, the third second antenna device 300(3) that is closest to the second second antenna device 300(2) generates the resonance electromagnetic wave in the similar manner as described above. The resonance electromagnetic wave can be generated sequentially from the first second antenna device 300(1) to the i-th second antenna device 300(*i*) by generating the resonance electromagnetic wave sequentially. The game chip 400 may be disposed anywhere at which the synthetic electromagnetic field intensity by the synthesis of the electromagnetic wave transmitted from the first antenna device 100 and these resonance electromagnetic waves is equal to or greater than the intensity I0, so as to produce the electromotive force necessary to drive the control unit 412 and the transmission/reception unit 414. Therefore, reading from and writing in the RFID IC tag are achieved.

In this configuration, even at a position separated from the first antenna device 100 and at which intensity of the electromagnetic wave generated by the first antenna device 100 is small, reading from and writing in the RFID IC tag of the game chip 400 are achieved by providing the second antenna devices 300 and generating the resonance electromagnetic wave to make the synthetic electromagnetic field intensity be equal to or greater than the intensity I0. Therefore, by providing the first antenna device 100 and plural second antenna devices 300, an area in which a magnetic field of which intensity is sufficient to produce the electromotive force necessary to drive the control unit 412 and the transmission/reception unit 414 of the game chip 400 may be increased. In particular, since the plural second antenna devices 300 are disposed at predetermined positions and all the second antenna devices 300 are made to resonate and produce predetermined electromotive force, a resonance electromagnetic field can be generated at a desired position and reading from and writing in the RFID tags existing at those desired positions are achieved. Since the second antenna devices 300 are made to resonate, the configuration is formed as if the first antenna device 100 extends to the positions of the second antenna devices 300.

In a desired configuration, the loop-shaped section of the antenna 110 of the first antenna device 100, the loop-shaped section of the antenna 320 of the second antenna device 300, and the loop-shaped section of the antenna 416 of the game chip 400 are arranged in parallel with one another. This configuration enables efficient transmission and reception of the electromagnetic wave. Note that it is not necessary that these loop-shaped sections of the antennas are arranged in parallel with one another. Even if these loop-shaped sections are not arranged in parallel, resonation of the second antenna devices 300 which makes the intensity of synthetic electromagnetic field be equal to or greater than the intensity I0 can produce the electromotive force necessary to drive the control unit 412 and the transmission/reception unit 414. Therefore, these antennas may be disposed at desired orientations as long as the second antenna devices 300 are made to resonate to cause the synthetic electromagnetic field intensity to be equal to or greater than the intensity I0.

(Chip Tray Structure 600)

Figure 8:
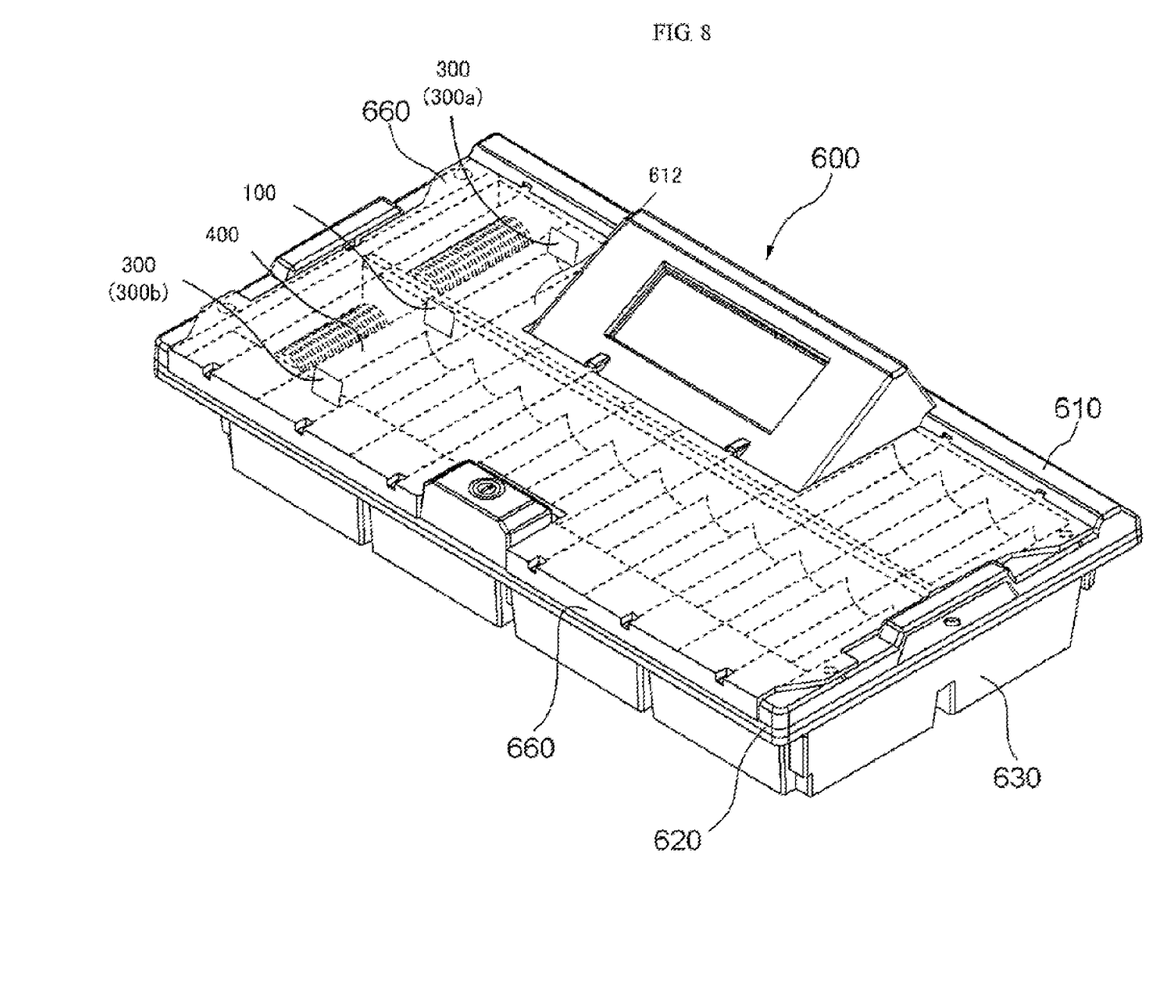
FIG. 8 is a perspective view illustrating a chip tray structure 600.

FIG. 8 is a perspective view illustrating a chip tray structure 600. The chip tray structure 600 has a stacked structure including three members: a chip tray 610, a board cover 620 and a base 630. The chip tray structure 600 further includes a lid member 660 which covers an upper part of the chip tray 610. The lid member 660 is configured to apply a lock to the chip tray 610.

The chip tray 610 is a tray for storing the game chips 400 which are to be distributed to the players and the game chips 400 collected from the players. The chip tray 610 includes plural grooves 612 for storing the game chips 400: for example, eighteen grooves 612 are formed from the near side to the far side. Each groove 612 is configured to store thirty game chips 400.

The first antenna device 100 and the second antenna device 300 may be formed in the chip tray structure 600 for the management of the game chips 400 in accordance with the chip identification information of the game chips 400 stored in the chip tray structure 600.

Figure 9:
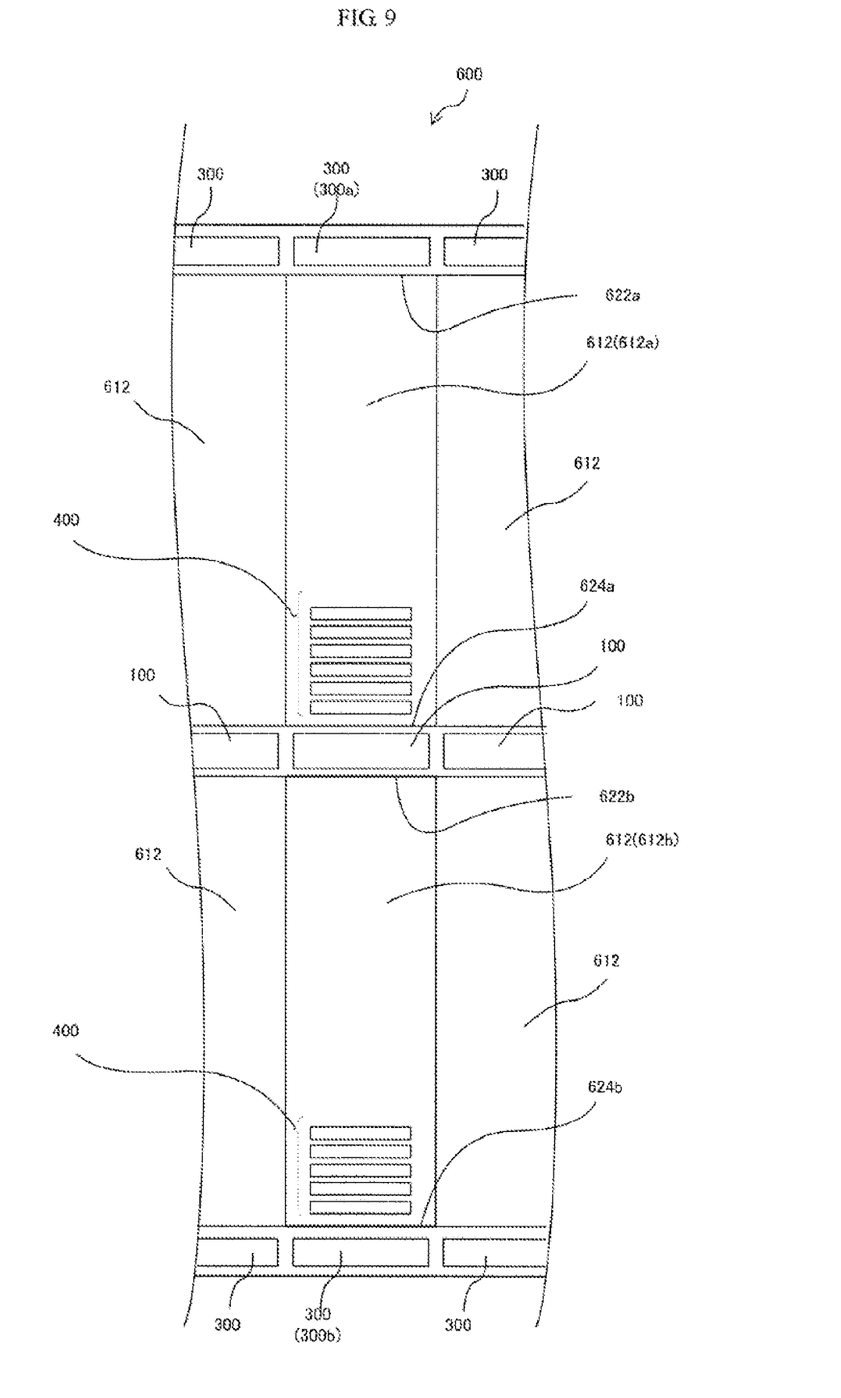
FIG. 9 is a diagram illustrating an outline of the first antenna device 100 and an outline of the second antenna device 300 which are formed in two grooves 612 which are arranged in series.

FIG. 9 is a diagram illustrating an outline of the first antenna device 100 and the second antenna devices 300 formed near the two grooves 612 arranged in series in the chip tray 610. In FIG. 9, two grooves 612 arranged in series are referred to as a groove 612a and a groove 612b.

The groove 612a and the groove 612b are formed in an elongated, substantially semi-cylindrical shape with a substantially semicircular cross section. The groove 612a includes a first end 622a and a second end 624a. The first end 622a and the second end 624a are formed to face each other at positions farthest from each other in the longitudinal direction of the groove 612a. In the groove 612a, up to thirty game chips 400 are stored between the first end 622a and the second end 624a. Similarly, the groove 612b includes a first end 622b and a second end 624b. The first end 622b and the second end 624b are formed to face each other at positions farthest from each other in the longitudinal direction of the groove 612b. In the groove 612b, up to thirty game chips 400 are received between the first end 622b and the second end 624b.

The first antenna device 100 is disposed between the second end 624a of the groove 612a and the first end 622b of the groove 612b. The first antenna device 100 is a loop antenna as described above. The antenna 416 of the game chip 400 is a loop antenna as those described above. The first antenna device 100 is disposed such that a surface made by the loop-shaped section of the first antenna device 100 is in substantially parallel with a surface made by the loop-shaped section of the game chip 400 stored in the groove 612a and the groove 612b. This configuration allows the lines of magnetic force produced by the first antenna device 100 to reliably penetrate the loop antenna of the game chip 400 and to efficiently transmit or receive the electromagnetic wave between the first antenna device 100 and the game chip 400.

A second antenna device 300a is disposed on the side of the first end 622a of the groove 612a and outside the groove 612a. Similarly, the second antenna device 300b is disposed on the side of the second end 624b of the groove 612b and outside the groove 612b. The second antenna devices 300a and 300b are loop antennas as those described above. The second antenna devices 300a and 300b are disposed such that a surface made by the loop-shaped section of the second antenna device 300a and a surface made by the loop-shaped section of the second antenna device 300b are substantially in parallel with the surface made by the loop-shaped section of the first antenna device 100. This configuration allows the lines of magnetic force produced by the first antenna device 100 and by the game chip 400 to reliably penetrate the loop antennas of the second antenna devices 300a and 300b and to efficiently transmit or receive the electromagnetic wave.

The electromagnetic wave generated by the first antenna device 100 spreads toward both the second antenna devices 300a and 300b. The electromagnetic wave spread toward the second antenna device 300a causes the resonance device 310 of the second antenna device 300a to resonate and causes the resonance electromagnetic wave to generate toward the groove 612a. In this manner, the electromagnetic wave generated by the first antenna device 100 and the electromagnetic wave generated and transmitted from the resonance device 310 of the second antenna device 300a are synthesized in the groove 612a.

The intensity of the electromagnetic wave generated by the first antenna device 100 is determined in accordance with the length of the groove 612a in the longitudinal direction. In particular, in a range from the first end 622a to second end 624a of the groove 612a, the intensity of the electromagnetic wave generated by the first antenna device 100 is determined such that the synthetic electromagnetic field intensity is equal to or greater than the intensity I0 as described above. It is thus possible to produce the electromotive force necessary to drive the control unit 412 and the transmission/reception unit 414 when the game chip 400 is disposed at any position in the groove 612a. Therefore, reading from and writing in the RFID IC tag is achieved.

Similarly, it is thus possible to produce the electromotive force necessary to drive the control unit 412 and the transmission/reception unit 414 when the game chip 400 is disposed at any position in the groove 612a. Therefore, reading from and writing in the RFID IC tag is achieved.

In this manner, two second antenna devices 300 (one second antenna device 300 and the other second antenna device 300) are provided on both sides of the first antenna device 100. A storing unit configured to store at least one game chip 400 is provided between the first antenna device 100 and one of the second antenna devices 300. A storing unit configured to store at least one game chip 400 is provided between the first antenna device 100 and the other of the second antenna devices 300.

Chip identification information is read from the game chip 400 stored between the first antenna device 100 and one of the second antenna devices 300 by the first antenna device 100 and one of the second antenna devices 300. Similarly, chip identification information is read from the game chip 400 stored between the first antenna device 100 and the other of the second antenna devices 300 by the first antenna device 100 and the other of the second antenna devices 300.

By disposing the first antenna device 100 and the second antenna devices 300 in the two grooves 612 which are arranged in series in the chip tray structure 600, the chip identification information of all the game chips 400 stored in the chip tray structure 600 can be read.

The chip tray 610, the board cover 620, the base 630 and the lid member 660 are preferably made of nonmetallic materials, such as plastic. If nonmetallic materials are used, a desired electromagnetic wave can be generated reliably by the first antenna device 100 and one of the second antenna devices 300.

Other Embodiment

In the embodiment described above, an example in the game chip 400 disposed between the first antenna device 100 and the second antenna device 300 is accessed has been described. The electromagnetic wave generated by the second antenna device 300, however, as illustrated in FIG. 7B, is generated not only between the first antenna device 100 and the second antenna device 300 but in areas outside the second antenna device 300: for example, an area located in the direction separating from the first antenna device 100 (refer to FIGS. 7A and 7B).

It is also possible to access the game chip 400 using the electromagnetic wave generated outside the second antenna device 300. That is, even if the game chip 400 is disposed outside of the second antenna device 300, the chip identification information of the game chip 400 can be read in any area included in the area H2 illustrated in FIG. 7B.

For example, the second antenna device 300 is disposed below the game table and the first antenna device 100 is disposed below the second antenna device 300. The area H2 generated by the second antenna device 300 leaks above the game table. In this configuration, the chip identification information of the game chip 400 disposed on the game table can be read.

Desired intensity and extension of the electromagnetic wave which leaks above the game table can be provided by adjusting the distance between the first antenna device 100 and the second antenna device 300 and the electric power supplied to the first antenna device 100. In particular, intensity of the resonance wave generated by the second antenna device 300 can be increased by increasing the size of the first antenna device 100 or by increasing the electric power supplied to the first antenna device 100. A range in which the resonance wave generated by the second antenna device 300 extends can be controlled by restricting the size of the second antenna device 300. In this case, the number of game chips 400 that can be read is increased and misreading of the game chip 400 that is disposed in an adjacent bet area can be prevented.

A desired area H2 of the resonance wave generated by the second antenna device 300 can be provided by adjusting, for example, the size of the first antenna device 100, electric power supplied to the first antenna device 100 and the size of the second antenna device 300.

The identification information access device can be applied to, for example, racks of warehouses and libraries for, for example, the inventory management of articles. For example, the first antenna device 100 is disposed, for example, on a wall surface or a pillar of the rack, and the second antenna device 300 is disposed, for example, on a wall surface or a pillar which are separated from the first antenna device 100. Various conditions are set such that the synthetic electromagnetic field intensity is equal to or greater than the intensity I0 in a space between the first antenna device 100 and the second antenna device 300 or such that the second antenna device 300 is made to resonate. In this configuration, an article into which the RFID IC tag is integrated is disposed in the space between the first antenna device 100 and the second antenna device 300. Identification information for identifying the article is stored in the RFID IC tag.

Since the RF reader/writer 200 is connected only to the first antenna device 100, the configuration and management of, for example, the warehouse and the library can be made simple. In many cases, for example, plural wall surfaces and pillars which constitute the rack in the warehouse or the library are arranged in parallel with one another. Therefore, it is necessary to provide plural antennas. Even in such a case, since it is only necessary to connect the RF reader/writer 200 to the antenna device 100, wiring is simplified and the configuration and management of, for example, the warehouse and the library can be made simple.

What is claimed is:

1. An identification information access device, comprising:
 a first antenna unit configured to read identification information stored in an RFID IC tag included in a storage medium;
 a control device configured to be electrically connected to the first antenna unit and to drive the first antenna unit so as to acquire the identification information in accordance with an electromagnetic wave transmitted from the first antenna unit; and
 a second antenna unit configured to be independent from the first antenna unit, to be disposed at a position separated from the first antenna unit, and not to be electrically connected to the first antenna unit and to the control device,
 wherein the storage medium further includes a control unit configured to read the identification information; and
 electromotive force necessary to drive the control unit is produced by an electromagnetic wave generated by driving the first antenna unit and driving the second antenna unit, and the electromotive force is supplied to the control unit,
 wherein an area on which the storage medium is to be disposed is determined by a distance between the first antenna unit and the second antenna unit, intensity of the electromagnetic wave, and sensitivity of the RFID IC tag.

2. The identification information access device according to claim 1, wherein
 the second antenna unit includes a resonance unit configured to receive the electromagnetic wave transmitted from the first antenna unit and to resonate with the received electromagnetic wave.

3. The identification information access device according to claim 2, wherein
 the resonance unit includes a resonant circuit provided with an antenna configured to receive the electromagnetic wave transmitted from the first antenna unit, an electrostatic member having predetermined electrostatic capacity, and a resistance member having predetermined resistance.

4. The identification information access device according to claim 1, wherein, at a position at which the storage medium can be disposed, intensity of the electromagnetic wave generated by driving the first antenna unit and driving the second antenna unit is made to be equal to or greater than predetermined intensity.

5. The identification information access device according to claim 2, wherein the frequency of the electromagnetic wave generated by driving the first antenna unit by the control device and the electromagnetic wave generated by driving the second antenna unit by the resonance unit is the same as the frequency of the electromagnetic wave transmitted from the first antenna unit.

6. The identification information access device according to claim 1, wherein the storage medium is a casino game chip into which an RFID IC tag is integrated.

7. The identification information access device according to claim 2, wherein, at a position at which the storage medium can be disposed, intensity of the electromagnetic wave generated by driving the first antenna unit and driving the second antenna unit is made to be equal to or greater than predetermined intensity.

8. The identification information access device according to claim 3, wherein, at a position at which the storage medium can be disposed, intensity of the electromagnetic wave generated by driving the first antenna unit and driving the second antenna unit is made to be equal to or greater than predetermined intensity.

9. The identification information access device according to claim 3, wherein the frequency of the electromagnetic wave generated by driving the first antenna unit by the control device and the electromagnetic wave generated by driving the second antenna unit by the resonance unit is the same as the frequency of the electromagnetic wave transmitted from the first antenna unit.

10. The identification information access device according to claim 4, wherein the frequency of the electromagnetic wave generated by driving the first antenna unit by the control device and the electromagnetic wave generated by driving the second antenna unit by the resonance unit is the same as the frequency of the electromagnetic wave transmitted from the first antenna unit.

11. The identification information access device according to claim 2, wherein the storage medium is a casino game chip into which an RFID IC tag is integrated.

12. The identification information access device according to claim 3, wherein the storage medium is a casino game chip into which an RFID IC tag is integrated.

13. The identification information access device according to claim 4, wherein the storage medium is a casino game chip into which an RFID IC tag is integrated.

14. The identification information access device according to claim 5, wherein the storage medium is a casino game chip into which an RFID IC tag is integrated.

15. The identification information access device according to claim 1, wherein the electromotive force is produced when the electromagnetic wave having intensity equal to or greater than a predetermined intensity is received by driving the first antenna unit and driving the second antenna unit.

16. The identification information access device according to claim 1, wherein the second antenna unit includes a plurality of antenna devices,
 each of the plurality of antenna devices includes a resonance unit,
 a resonance are sequentially generated in the plurality of antenna devices,
 any one of the plurality of antenna devices receives an electromagnetic wave and resonates with the received electromagnetic wave to transmit the electromagnetic wave to an adjacent antenna device of the plurality of antenna devices, and
 an antenna device that is closest to the first antenna unit from among the plurality of antenna devices receives the electromagnetic wave transmitted from the first antenna unit.

17. The identification information access device according to claim 1, wherein the second antenna unit includes a first antenna device and a second antenna device that are provided on both sides of the first antenna unit, respectively, and
 an electromagnetic wave includes a first electromagnetic wave generated between the first antenna unit and the first antenna device and a second electromagnetic wave generated between the first antenna unit and the second antenna device.

18. The identification information access device according to claim 1, wherein the electromagnetic wave generated by driving the second antenna unit is further generated in an area located in a direction separating from the first antenna unit.

* * * * *